(12) United States Patent
Qiao et al.

(10) Patent No.: US 10,785,309 B2
(45) Date of Patent: Sep. 22, 2020

(54) SESSION MONITORING METHOD, APPARATUS, AND SYSTEM

(71) Applicant: HUAWEI TECHNOLOGIES CO., LTD., Shenzhen, Guangdong (CN)

(72) Inventors: Lei Qiao, Beijing (CN); Hewei Liu, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 8 days.

(21) Appl. No.: 16/138,649

(22) Filed: Sep. 21, 2018

(65) Prior Publication Data

US 2019/0028551 A1 Jan. 24, 2019

Related U.S. Application Data

(63) Continuation of application No. PCT/CN2017/075021, filed on Feb. 27, 2017.

(30) Foreign Application Priority Data

Mar. 25, 2016 (CN) .......................... 2016 1 0179769

(51) Int. Cl.
*H04L 29/08* (2006.01)
*H04L 29/06* (2006.01)

(52) U.S. Cl.
CPC .............. *H04L 67/14* (2013.01); *H04L 29/08* (2013.01); *H04L 67/06* (2013.01);
(Continued)

(58) Field of Classification Search
CPC ....................................................... H04L 67/14
(Continued)

(56) References Cited

U.S. PATENT DOCUMENTS 7,761,514 B2 * 7/2010 Popescu ................ H04L 12/185
370/255
8,099,504 B2 * 1/2012 Cherian .................. H04L 67/14
709/227

(Continued)

FOREIGN PATENT DOCUMENTS

CN 101379761 A 3/2009
CN 102713877 A 10/2012
(Continued)

*Primary Examiner* — Ondrej C Vostal
(74) *Attorney, Agent, or Firm* — Womble Bond Dickinson (US) LLP

(57) ABSTRACT

A session monitoring method is used for determining session information in a service server, and the session information includes at least one type of current session information or historical session information. The current session information is sent to a control device, and the current session information is used by the control device to determine a control instruction. The historical session information is sent to an analysis device, and the historical session information is used by the analysis device to analyze a historical session. The current session information is analyzed, so as to obtain an analysis result of the current session information. Therefore, data is separately processed according to a requirement. This facilitates implementation of a session monitoring solution, reduces resource consumption, and meets a service requirement of session monitoring.

9 Claims, 7 Drawing Sheets

(52) U.S. Cl.
CPC ...... *H04L 67/1002* (2013.01); *H04L 67/1097* (2013.01); *H04L 67/146* (2013.01); *H04L 67/22* (2013.01); *H04L 67/42* (2013.01); *Y02D 50/10* (2018.01)

(58) Field of Classification Search
USPC ....................................................... 709/223
See application file for complete search history.

(56) References Cited

U.S. PATENT DOCUMENTS

| | | | | |
|---|---|---|---|---|
| 8,452,877 | B2* | 5/2013 | Zawacki | H04L 63/0861 709/227 |
| 8,473,598 | B1* | 6/2013 | Piper | H04L 67/14 709/223 |
| 8,839,087 | B1* | 9/2014 | Hayden | G06F 17/2288 715/204 |
| 9,342,559 | B1* | 5/2016 | Jedrzejowicz | G06Q 30/016 |
| 10,237,298 | B1* | 3/2019 | Nguyen | H04L 67/14 |
| 2004/0267668 | A1* | 12/2004 | Aissi | G06F 21/60 705/50 |
| 2005/0175031 | A1* | 8/2005 | Harley, Jr. | H04L 63/0428 370/466 |
| 2007/0067451 | A1* | 3/2007 | Oshiba | H04L 43/00 709/224 |
| 2009/0132579 | A1* | 5/2009 | Kwang | H04L 67/22 |
| 2011/0099480 | A1* | 4/2011 | Sama | G06F 9/44505 715/736 |
| 2012/0246311 | A1 | 9/2012 | Kagitani | |
| 2013/0007241 | A1* | 1/2013 | Trahan | H04L 67/40 709/223 |
| 2013/0080420 | A1* | 3/2013 | Taylor | H04L 67/02 707/722 |
| 2014/0258534 | A1 | 9/2014 | Allrich et al. | |
| 2015/0046531 | A1 | 2/2015 | Sakae | |
| 2015/0180979 | A1* | 6/2015 | Jambunathan | H04L 67/141 713/150 |
| 2016/0072721 | A1* | 3/2016 | Hill | H04L 67/303 709/226 |
| 2016/0173540 | A1* | 6/2016 | Linden | H04L 67/146 705/26.8 |
| 2017/0085451 | A1 | 3/2017 | Clemm et al. | |
| 2017/0147795 | A1* | 5/2017 | Sardesai | H04L 67/1097 |

FOREIGN PATENT DOCUMENTS

| | | |
|---|---|---|
| CN | 103003802 A | 3/2013 |
| CN | 104572420 A | 4/2015 |
| CN | 105144108 A | 12/2015 |

* cited by examiner

SESSION MONITORING METHOD, APPARATUS, AND SYSTEM

CROSS-REFERENCE TO RELATED APPLICATIONS

This application is a continuation of International Application No. PCT/CN2017/075021, filed on Feb. 27, 2017, which claims priority to Chinese Patent Application No. 201610179769.3, filed on Mar. 25, 2016. The disclosures of the aforementioned applications are hereby incorporated by reference in their entireties.

TECHNICAL FIELD

The present invention relates to the field of session monitoring, and in particular, to a session monitoring method, apparatus, and system.

BACKGROUND

Session monitoring mainly refers to recording and monitoring related information of a status change of a session between a client and a service server. For example, content such as a user name, a client, a time stamp, or a session status is monitored and used for charging, auditing, monitoring, data mining, or the like.

In an existing session monitoring solution, a big data analysis device may process historical session information in a service server in an off-line manner, real-time performance is poor, and a current session is difficult to be monitored directly. Alternatively, a current session may be monitored in a polling manner or by using an asynchronous trigger method. This is unreliable, consumes a large quantity of resources, and cannot maintain historical session information of a service. In conclusion, the existing session monitoring solution is difficult to implement, consumes a large quantity of resources, and cannot meet a service requirement of session monitoring.

SUMMARY

Embodiments of the present invention provide a session monitoring method, apparatus, and system in a distributed system, so as to balance current session information and historical session information. This is relatively easy to implement, and can better balance system costs and a performance requirement of service monitoring.

According to an aspect, an embodiment of the present invention provides a session monitoring method. Session information in a service server is determined, and the session information includes at least one type of current session information or historical session information. The current session information is sent to a control device, and the current session information is used by the control device to determine a control instruction. The control instruction includes at least one type of a first control instruction or a second control instruction. The first control instruction is used to instruct the service server to perform one of the following operations: stopping sending the current session information, continuing to send all of the current session information, or continuing to send some of the current session information. The second control instruction is used to instruct the service server to stop or continue the current session. The historical session information is sent to an analysis device, and the historical session information is used by the analysis device to analyze a historical session. Therefore, a current session and a historical session are separately processed according to a requirement. Necessary current session information and unnecessary current session information are determined according to the current session. The necessary current session information is sent to the control device, so as to reduce current session information sent to the control device. This facilitates implementation of a session monitoring solution, reduces resource consumption, and meets a service requirement of session monitoring.

In an implementation, the method is used in a distributed storage system. The distributed storage system further includes a load balancing device and one or more service servers. The load balancing device is configured to dispatch a request from a client to the one or more service servers. Session information in the service server is determined, and the session information includes at least one type of current session information or historical session information.

In one embodiment, the method further includes: receiving the first control instruction sent by the control device, and determining, according to the first control instruction, the current session information to be sent to the control device. Therefore, the current session is monitored in a more targeted manner, analysis workload of the current session information is reduced, and efficiency is improved.

In one embodiment, the method further includes: receiving the second control instruction, and continuing or stopping the on-going current session with the client according to the second control instruction. Additional system consumption is saved by continuing or stopping the session with the client.

According to another aspect, an embodiment of the present invention provides a session monitoring method. A control device receives current session information sent by a service server. The current session information is analyzed, and a control instruction to be sent to the service server is determined according to an analysis result of the current session information. The control instruction includes at least one type of a first control instruction or a second control instruction. The first control instruction is used to instruct the service server to perform one of the following operations: continuing to send or stopping sending all of the current session information, continuing to send some of the current session information, or stopping sending the current session information. The second control instruction is used to instruct the service server to stop or continue a current session. The determined control instruction is sent to the service server. The current session information is analyzed, so as to obtain an analysis result. The first control instruction and the second control instruction are determined according to the analysis result and sent to the service server, so that the current session information is filtered, analyses of the received current session information are reduced, and resource consumption of the control device is reduced.

According to still another aspect, an embodiment of the present invention provides a service server including a processing unit and a sending unit. The processing unit is configured to determine session information in the service server. The session information includes at least one type of current session information or historical session information. The sending unit is configured to send the session information, and send the current session information to a control device. The current session information is used by the control device to determine a control instruction. The control instruction includes at least one type of a first control instruction or a second control instruction. The first control instruction is used to instruct the service server to perform one of the following operations: stopping sending the current session information, continuing to send all of the current session information, or continuing to send some of the current session information. The second control instruction is used to instruct the service server to stop or continue the current session. The historical session information is sent to an analysis device, and the historical session information is used by the analysis device to analyze a historical session. Therefore, a current session and a historical session are separately processed according to a requirement. Necessary current session information and unnecessary current session information are determined according to the current session. Only the necessary current session information is sent to the control device. This facilitates implementation of a session monitoring solution, reduces resource consumption, and meets a service requirement of session monitoring.

In one embodiment, the service server further includes an obtaining unit, and the obtaining unit is configured to: receive the first control instruction sent by the control device, and determine, according to the first control instruction, the current session information sent by the sending unit to the control device. Therefore, the current session information is sent to the control device in a targeted manner, a data analysis amount of a first control device is reduced, and additional consumption is relatively little.

In one embodiment, the service server further includes an obtaining unit, and the obtaining unit is configured to: receive the second control instruction sent by the control device, and determine, according to the second control instruction, that the service server continues or stops the on-going current session with the client. Additional system consumption is saved by continuing or stopping the session with the client.

According to yet another aspect, an embodiment of the present invention provides a session control apparatus including a receiving unit and a processing unit. The receiving unit is configured to receive current session information from a service server. The processing unit analyzes the current session information, and determines, according to an analysis result of the current session information, a control instruction to be sent to the service server. The control instruction includes at least one type of a first control instruction or a second control instruction. The first control instruction is used to instruct the service server to perform one of the following operations: continuing to send all of the current session information, stopping sending the current session information, or continuing to send some of the current session information. The second control instruction is used to instruct the service server to stop or continue a current session. The determined control instruction is sent to the service server. The current session information is analyzed, so as to obtain an analysis result. The first control instruction and the second control instruction are determined according to the analysis result and sent to the service server, so that the current session information is filtered. This facilitates implementation of a session monitoring solution, reduces resource consumption, and meets a service requirement of session monitoring.

According to a still yet another aspect, an embodiment of the present invention provides a service server including a processor, a memory, a communications interface, and a bus. The processor, the memory, and the communications interface communicate by using the bus. The communications interface is configured to connect to an external device and a client. The memory stores session information and a program. When the service server runs, the processor executes the program stored in the memory. It is determined according to the stored program that the session information in the service server is current session information or historical session information. The current session information is sent to a control device, and the current session information is used by the control device to determine a control instruction. The control instruction includes at least one type of a first control instruction or a second control instruction. The first control instruction is used to instruct the service server to perform one of the following operations: stopping sending the current session information, continuing to send all of the current session information, or continuing to send some of the current session information. The second control instruction is used to instruct the service server to stop or continue the current session. The historical session information is sent to an analysis device, and the historical session information is used by the analysis device to analyze a historical session. Therefore, a current session and a historical session are separately processed according to a requirement. Necessary current session information and unnecessary current session information are determined according to the current session. Only the necessary current session information is sent to the control device. This facilitates implementation of a session monitoring solution, reduces resource consumption, and meets a service requirement of session monitoring.

In one embodiment, the program is further used for receiving the first control instruction sent by the control device, and determining, according to the first control instruction, the current session information to be sent to the control device.

In a possible design, the program is further used for receiving the second control instruction sent by the control device, and continuing or stopping the on-going current session with the client according to the second control instruction.

According to a further aspect, an embodiment of the present invention provides a service server including a processor, a memory, a communications interface, and a bus. The processor, the memory, and the communications interface communicate by using the bus. The communications interface is configured to connect to an external device and a client. The memory stores session information and a program. When the service server runs, the processor executes the program stored in the memory. Current session information sent by the service server is received according to the stored program. The current session information is analyzed, and a control instruction to be sent to the service server is determined according to an analysis result of the current session information. The control instruction includes at least one type of a first control instruction or a second control instruction. The first control instruction is used to instruct the service server to perform one of the following operations: continuing to send the current session information, stopping sending all of the current session information, or continuing to send some of the current session information. The second control instruction is used to instruct the service server to stop or continue the current session. The determined control instruction is sent to the service server. Therefore, the current session information is filtered, and analyses of the received current session information are reduced. This facilitates implementation of a session monitoring solution, reduces resource consumption, and meets a service requirement of session monitoring.

According to a still further aspect, an embodiment of the present invention provides a session monitoring system including a service server, a control device, and an analysis device. The service server is configured to determine session information, and the session information includes at least one type of current session information or historical session information. The current session information is sent to the control device, and the current session information is used by the control device to determine a control instruction. The control instruction includes at least one type of a first control instruction or a second control instruction. The first control instruction is used for performing one of the following operations: The service server stops sending the current session information, continues to send all of the current session information, or continues to send some of the current session information. The second control instruction is used to instruct the service server to stop or continue a current session. The historical session information is sent to the analysis device, and the historical session information is used by the analysis device to analyze a historical session. The control device is configured to receive current session information sent by the service server. The current session information is analyzed, and a control instruction to be sent to the service server is determined according to an analysis result of the current session information. The determined control instruction is sent to the service server. The current session information is analyzed, so as to obtain an analysis result. The first control instruction and the second control instruction are determined according to the analysis result and sent to the service server, so that the current session information is filtered, analyses of the received current session information are reduced, and additional consumption of the control device is saved. The analysis device is configured to: receive the historical session information sent by the service server, and analyze the historical session information, so as to obtain an analysis result of the historical session.

In one embodiment, the control device is further configured to send the determined control instruction to the service server; and the service server is further configured to: receive the control instruction sent by the control device, and perform an operation indicated in the control instruction sent by the control device. Session information sent by the service server is monitored according to the control instruction, and a session performed by the service server is determined according to the control instruction. This improves controllability of a session and a session is obtained in a more targeted manner.

In one embodiment, the session monitoring system further includes a message transmission device, and the message transmission device is configured to receive the current session information and the historical session information sent by the service server. The message transmission device is further configured to: add the received current session information to a current session information queue of the service server, and send current session information in the current session queue to the control device. The historical session information is added to a historical session information queue of the service server, and historical session information in the historical session queue is sent to the analysis device. The message transmission device is disposed, and a queue is separately created for current session information and historical session information that are sent by each service server, so that session transmission can be better controlled.

In one embodiment, the message transmission device is configured to receive the control instruction sent by the control device. The control instruction is added to a control instruction queue of a service server indicated by the instruction, and control instructions in the control instruction queue of the service server are sent to the corresponding service server. The message transmission device is disposed, and a queue is separately created for the control instructions sent to each service server, so that control instruction transmission can be better controlled.

According to the session monitoring method, apparatus, and system in the embodiments of the present invention, a session is determined as a current session or a historical session, current session information is sent to a control device, and the current session information is analyzed, so as to obtain an analysis result of the current session information. A control instruction is sent according to the analysis result, and a current session information sent to the control device is adjusted, or a session with a client is stopped or continues. A capability of control over the current session is improved and a current session analysis amount is reduced. Historical session information is sent to an analysis device. The historical session information that needs relatively more analyses is sent to the analysis device, and the analysis device analyzes the historical session information. Therefore, data is separately processed according to a requirement. This facilitates implementation of a session monitoring solution, reduces resource consumption, and meets a service requirement of session monitoring.

DESCRIPTION OF EMBODIMENTS

Technical solutions in embodiments of the present invention are further described below in detail with reference to accompanying drawings and embodiments.

The embodiments of the present invention provide a session monitoring method, device, and apparatus. A session generated after a service server and a client are connected is obtained from the service server, and the session is monitored and controlled. Current session information and historical session information included in the obtained session information are separately sent. The historical session information is sent to an analysis device to be analyzed, and the current session information is sent to a control device to be analyzed. A control instruction is sent to the service server according to an analysis result of the current session information. In the embodiments of the present invention, the current session information and the historical session information are separately sent to different devices, so that the control device and the analysis device are configured differently according to characteristics of the current session information and the historical session information, the current session information is analyzed and controlled, and the historical session information is analyzed.

Figure 1:
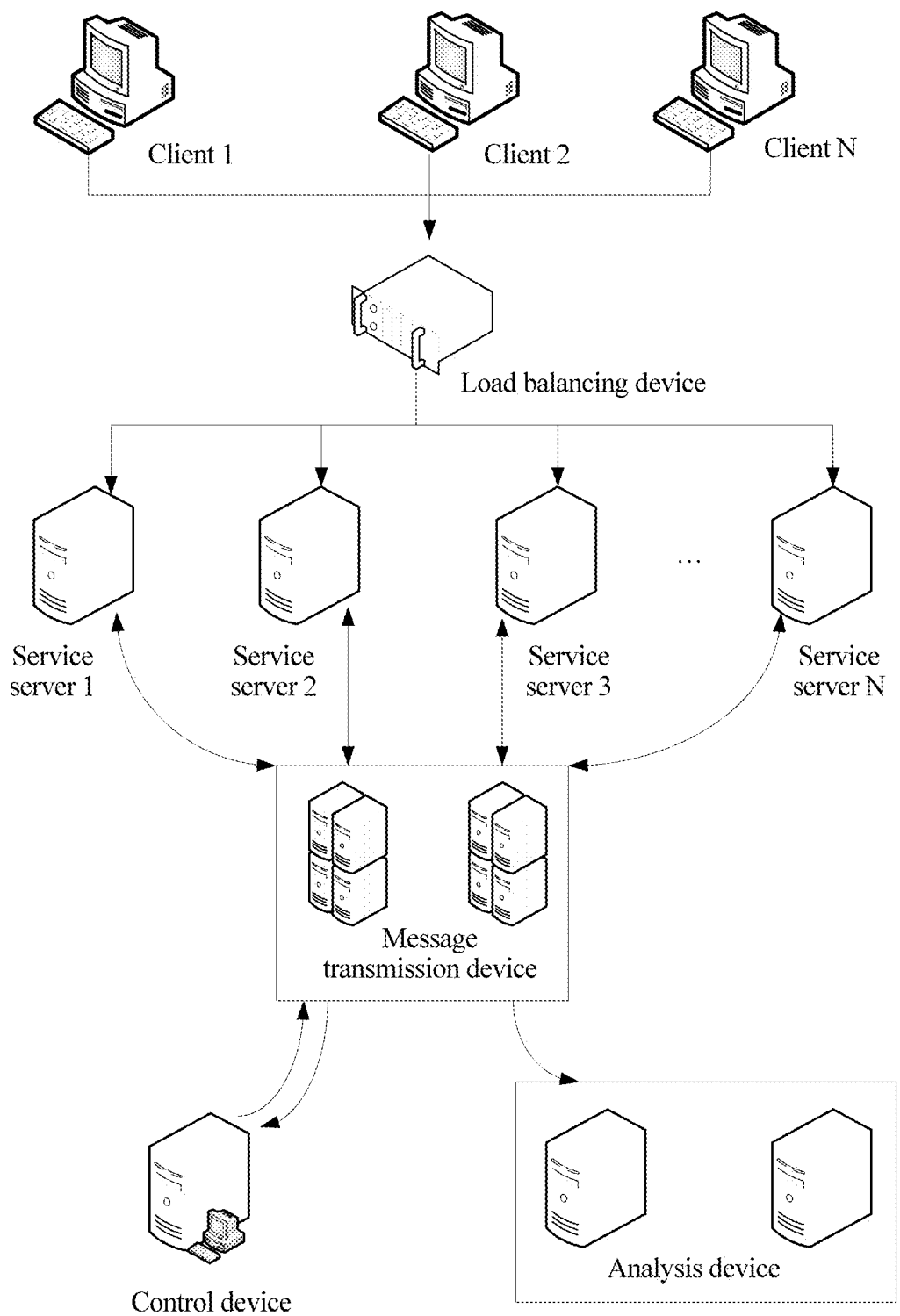
FIG. 1 is a structural relationship diagram of a session monitoring system according to an embodiment of the present invention.

FIG. 1 is a structural relationship diagram of a session monitoring system according to an embodiment of the present invention. As shown in FIG. 1, the session monitoring system is used to monitor a session in a distributed system. The distributed system includes a load balancing device and one or more service servers. When a client sends a request to the one or more service servers, the load balancing device receives the request sent by the client, and allocates the request to any one of the one or more service servers, so that a connection is established between the client and the service server, and the client performs another operation on the service server. When the service server establishes a connection to the client according to the request sent by the client, or when the client performs another operation on the service server after the service server establishes a connection to the client, a session is performed and session information is generated. The session information is stored in the service server. The session monitoring system is used to obtain the session information from the service server.

Sessions are classified into a current session and a historical session. The current session is an on-going session, and the historical session is an ended session. Content of current session information increases as content of a session between the service server and the client changes. It should be noted that in a specific implementation process, a current session and a historical session are determined according to a moment at which the service server executes a session information determining instruction. That is, a current session is a session performed when a session information determining instruction is executed or in a time period in which the session information determining instruction is executed. Correspondingly, a historical session is a session ended at the foregoing moment or in the foregoing time period. A specific determining condition may be preset. In an example, the current session information is stored in the service server, and is easily modified when a status of the session between the service server and the client changes. Content of historical session information is fixed. In an example, the historical session information is stored in a magnetic disk.

The session monitoring system further includes a message transmission device, an analysis device, and a control device. The service server sends the current session information and the historical session information to the message transmission device. The message transmission device receives the session information sent by the service server, and separately sends the session information to the analysis device and the control device. Session information sent to the analysis device is the historical session information, and session information sent to the control device is the current session information. The analysis device analyzes the historical session information, and the control device analyzes and controls the current session information.

In this embodiment of the present invention, the session information sent to the analysis device is the historical session information, and the session information sent to the control device is the current session information. Any device to which the current session information is sent and that can both analyze the session information and control, according to an analysis result, the current session information sent to the device may be the control device in the sense of this embodiment of the present invention. Any device that can analyze received session information may be the analysis device in the sense of this embodiment of the present invention.

In one embodiment, each piece of session information includes any one of multiple states such as "Connected", "Login", "Active", "Logout", and "Disconnected", and includes information, such as a time, of each state. In an example, the "Connected" state is used to indicate that a session is created. The "Login" state is used to determine that a session of the client is performed by a specific user. The "Active" state is used to indicate frequent operations on the client. The "Logout" state is used to indicate that a session of the client is performed not by a specific user but by an uncertain user. The "Disconnected" state is used to indicate that a session between the service server and the client is complete and connection is cut off, or that no session is performed between the service server and the client in a specific time period (for example, 30 seconds) and the service server is disconnected from the client.

The service server is further configured to determine a status of a session. The service server determines a status of each session, so as to determine that the status of each session is a current session or a historical session.

In one embodiment, when determining a status of a session, the service server determines whether the status includes a "Disconnected" state, so as to determine that the session is a current session or a historical session. If a status of a session includes the "Disconnected" state, information about the session is historical session information. If a status of a session does not include the "Disconnected" state, information about the session is current session information.

The message transmission device is configured to receive the current session information and the historical session information sent by the service server. The message transmission device separately adds, to respective queues, current session information and historical session information sent by each service server. That is, for each service server, the message transmission device includes a current session information queue and a historical session information queue. The current session information is sent to the control device according to a sequence of the current session information queue. The historical session information is sent to the analysis device according to a sequence of the historical session information queue.

In one embodiment, when the current session information and the historical session information are being sent to the control device and the analysis device respectively, current session information in the current session information queue is preferably sent to the control device, so as to ensure that the current session information can be analyzed in a timely manner, and a control instruction is sent in a timely manner according to an analysis result.

In this embodiment of the present invention, the message transmission device is further configured to receive a control instruction sent by the control device. Control instructions received by the message transmission device form different queues according to different service servers to which the control instructions are sent, and the control instruction queues are sent to interaction modules of different service servers.

The message transmission device may be an independent device, and is connected to a control device, the analysis device, and the service server by using an Ethernet interface.

In one embodiment, the session monitoring system may not include the message transmission device. The service server directly sends the current session information to the control device, and sends the historical session information to the analysis device. The analysis device analyzes the historical session information, and the control device analyzes and controls the current session information. For example, an FTP protocol interface is configured on the service server, and the analysis device directly connects to the service server by using an FTP protocol. The analysis device sends a request to the service server to obtain the historical session information in the service server. The FTP protocol interface configured on the service server is merely an example of the present invention, and the analysis device may also connect to the service server by means of SFTP, TFTP, or the like.

The control device receives the current session information, and analyzes the current session information, so as to obtain an analysis result of the current session information. A control instruction is determined according to the analysis result of the current session information. In this embodiment of the present invention, the control device may further control the current session sent to the control device, and control the current session between the service server and the client.

In one embodiment, the control instruction includes any one of a first control instruction or a second control instruction. The first control instruction is used to instruct the service server to perform one of the following operations: continuing to send all of the current session information, stopping sending the current session information, or continuing to send some of the current session information. After obtaining the current session information, the control device sends the control instruction to the service server according to the analysis result of the current session information. The second control instruction is used to instruct the service server to stop or continue the current session.

In one embodiment, the first control instruction may be the following: "Do not send current session information including content such as the "Logout" state to the control device". Alternatively, the first control instruction may be set before session monitoring. For example, information generated from a session between the service server and a client that is logged in by using a terminal of a specific brand (for example, SAMSUNG) or a specific type is not sent to the control device. Alternatively, the first control instruction may be the following: After analyzing the current session information, the control device is disconnected from the client according to an analysis result of the current session. For example, a session that is generated between a service server and a client and that uses a session number "102356" is disconnected, and the session with the number "102356" becomes a historical session.

The analysis device is configured to: receive the historical session information sent by the message transmission device, and analyze the received historical session information, so as to obtain an analysis result of the historical session information.

In this embodiment of the present invention, current session information and historical session information are separately sent to different devices. The historical session information that needs relatively more analyses is sent to a dedicated analysis device, and the current session information that needs to be analyzed and controlled according to an analysis result is sent to the control device. Therefore, not only a data processing capability is improved, but also a capability of control over some data that can be controlled is improved.

Figure 2:
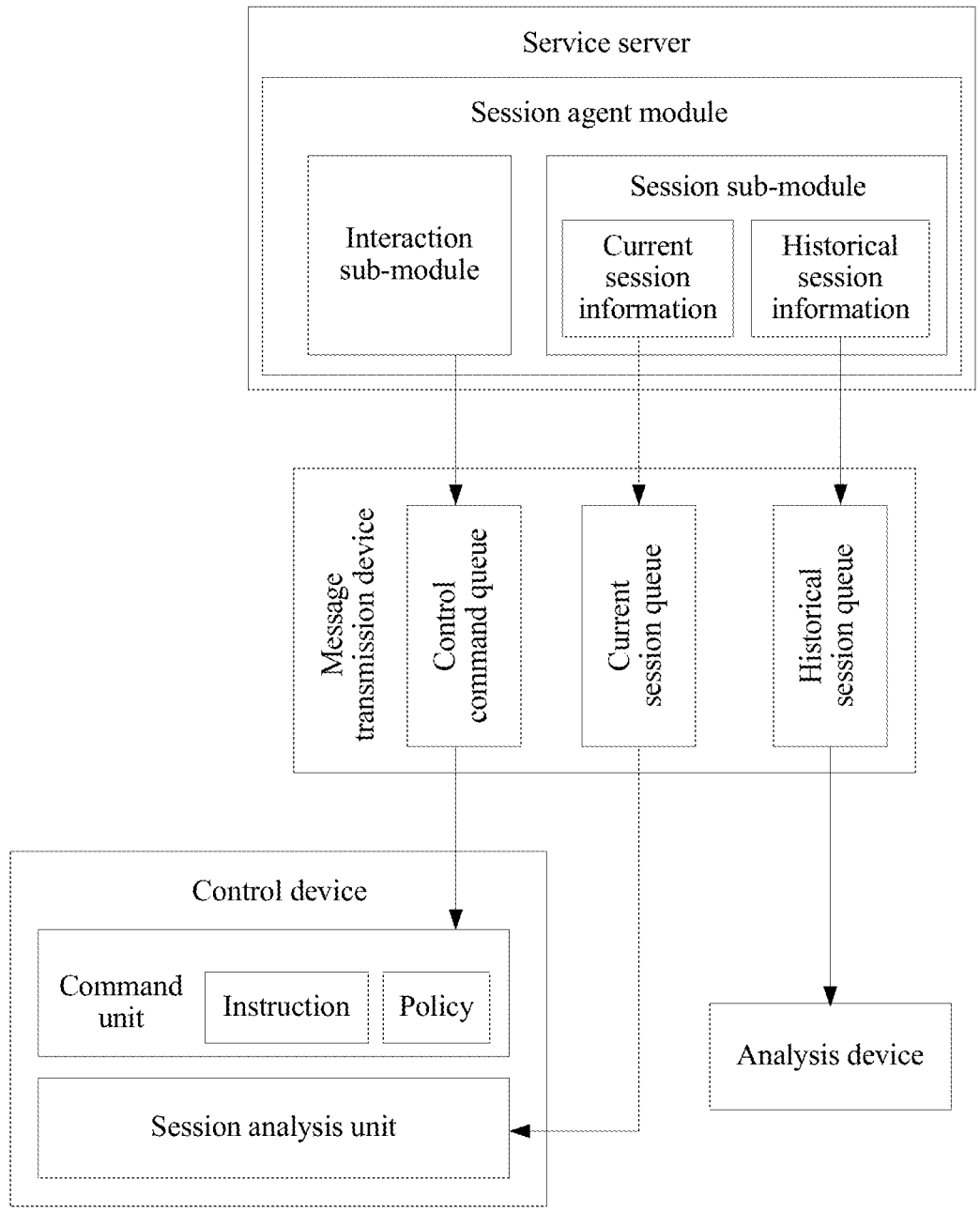
FIG. 2 is a flow diagram of message transmission of a session monitoring system according to an embodiment of the present invention.

FIG. 2 is a flow diagram of message transmission of a session monitoring system according to an embodiment of the present invention. FIG. 2 schematically shows functional modules that may be included in each of devices in the session monitoring system in this embodiment. As shown in FIG. 2, a service server includes a session agent module. The session agent module is configured to obtain a session generated after the service server establishes a connection to a client according to a request from the client. The session agent module then obtains session information, and the obtained session information is classified into current session information and historical session information. The service server includes a status determining unit. When the session agent module is obtaining the session information, the status determining unit determines that the obtained session information is current session information or historical session information. The session agent module further includes a session sub-module. The session sub-module is configured to separately send the current session information and the historical session information to a message transmission device. It should be understood that FIG. 2 is merely an implementation example, and is not construed as a limitation to the present invention.

In one embodiment, an asynchronous trigger mechanism is set in the service server. When the service server detects that the current session information or the historical session information includes new session information, the service server sends the new session information to the session sub-module. That the service server uses the asynchronous trigger mechanism to obtain the session information is merely a specific implementation in this embodiment of the present invention, and is not construed as a limitation to the present invention. In this embodiment of the present invention, alternatively, new session information included in the service server may be determined in a polling manner, and then the session information is sent to the session sub-module.

In this embodiment of the present invention, the session information further includes a session identifier. The session identifier is used to differentiate session information generated in different service servers.

In an embodiment of the present invention, the session agent module further includes an interaction sub-module. The interaction sub-module is configured to receive a control instruction. The control instruction is used to instruct the session agent module to, for example, stop monitoring a session in current sessions, or start to monitor a session in the current sessions.

In an example, the control instruction received by the interaction sub-module may be used to stop a session between the service server and the client, so that the session becomes a historical session.

In this embodiment of the present invention, the session agent module may be a program installed on the service server, so that session information in the service server may be directly obtained, and the session information is sent to another device by using an interface (for example, an Ethernet interface) of the service server.

When receiving current session information sent by a session sub-module of a service server, the message transmission device determines, according to identifier information included in the session information, the service server that generates the session, and adds the received current session information to a current session queue corresponding to the service server. When receiving historical session information sent by a session sub-module of a service server, the message transmission device determines, according to identifier information included in the session information, the service server that generates the session, and adds the received historical session information to a historical session queue corresponding to the service server. Then the message transmission device sends current session information included in current session queues of service servers to a control device according to a queue sequence, and sends historical session information included in historical session queues of service servers to the analysis device according to a queue sequence.

The message transmission device further receives a control instruction sent by the control device. The control instruction includes information about a service server implementing the instruction. When receiving the control instruction, the message transmission device adds the control instruction to a control instruction queue corresponding to the service server according to the information about the service server implementing the instruction, and sends control instructions in the control instruction queue to an interaction sub-module of a session agent in the service server according to a time sequence.

In one embodiment, the message transmission device preferably sends the control instruction to the session agent module, then sends the control instruction to the interaction sub-module, and sends the session information to the control device and the analysis device, so that the control instruction can be sent to the session agent module in a more timely manner, and the session agent module can, in a more timely manner, start and stop monitoring the session information, and stop the session according to the control instruction.

The control device includes a session analysis unit and a command unit. The session analysis unit is configured to: receive the current session information sent by the message transmission device, and analyze the received session information, so as to obtain content of the current session. In an example, the current session information may be analyzed by using multiple processes, so that the current session information is more quickly analyzed.

The command unit is configured to send a control instruction. Control instructions are classified into a "first control instruction" and a "second control instruction". The "second control instruction" may be used to start or stop monitoring a session, so as to reduce unnecessary analyses of the current session information. A specific operating manner of the second control instruction is disconnecting the session between the service server and the client. The "first control instruction" is used to determine current session information sent to the control device, so as to avoid resource consumption caused by sending all of the current session information to the control device. The first control instruction and the second control instruction may be sent according to a result obtained after the session agent module analyzes the current session information, or may be sent according to other information.

In one embodiment, the "first control instruction" is used to instruct to monitor session information including, for example, an "Active" state in the current session information. The session agent module sends corresponding current session information to the control device according to content of the "first control instruction".

In one embodiment, the session analysis unit and the command unit may be implemented by a software program.

To more completely describe this embodiment of the present invention, the following uses a complete example to describe in more detail this embodiment of the present invention.

In this example, a session monitoring system includes a service server, a message transmission device, a control device, and an analysis device. A distributed system includes a service server and a load balancing device. This service server and the service server in the session monitoring system are the same service server, and the service server includes a first service server and a second service server. The first service server receives a request from a first client in multiple clients by using the load balancing device, and the first service server establishes a connection to the first client according to the request from the first client, and generates a first current session.

An asynchronous trigger mechanism is set in the first service server. The asynchronous trigger mechanism is used to enable session information to be sent to a first session agent in the first service server when a new session is generated in the service server. A status monitoring unit is further disposed in the first service server. The status monitoring unit is configured to determine that the session transmitted to the first session agent is a current session or a historical session. The status monitoring unit determines that the first current session is the current session, and the first current session information is transmitted to a session sub-module of the first session agent. The first current session information in the session sub-module of the first session agent is sent to the message transmission device by using a current session transmission path.

The message transmission device receives the first current session information from the current session path, and adds, according to service server information included in the first current session information, the first current session information to a first current session queue corresponding to the first service server. The message transmission device sends session information in a first current message transmission queue to the control device according to a time sequence.

The control device receives the first current session information sent from the first current session queue in the message transmission device. The session analysis unit in the control device analyzes the first current session information, and obtains an analysis result of the first current session information. A control instruction sent to the first service server is determined according to the analysis result of the first current session information. The command unit sends the control instruction to the service server, and the control instruction is used to instruct the service server to disconnect from the first client. The control device sends the control instruction to the message transmission device.

The message transmission device receives the control instruction, and adds the control instruction to a first control instruction queue according to the first service server indicated by the control instruction. The message transmission device sends control instructions in the first control instruction queue to the first service server according to a time sequence.

A first interaction sub-module in the first session agent of the first service server receives the control instruction. A session between the first service server and the first client is disconnected according to the control instruction. A new state "Disconnected" is added to the information about the first current session between the first client and the first service server. The first current session becomes a first historical session. Because the first historical session is generated, the asynchronous trigger mechanism in the service server obtains first historical session information, and sends the information to the first session agent.

In a specific embodiment of the present invention, that the first service server and the first client are disconnected according to the control instruction of the control device is merely an example of disconnection of the client from the service server. The disconnection of the client from the service server may be any one of the following cases: No new session is generated within a time threshold, or the client actively requests for disconnection. This is not limited in the present invention. In any case, when a service server is disconnected from a client, a current session generated between the service server and the client becomes a historical session.

The service server sends the first historical session information to a first session sub-module of the first session agent. The first session sub-module sends the first historical session information to the message transmission device by using a historical session information path.

The message transmission device receives the first historical session information from the first session sub-module by using the historical session information path. The message transmission device adds the first historical session information to a first historical session information queue according to service server information included in the first historical session information. The message transmission device sends historical session information included in the first historical session information queue to the analysis device according to a time sequence.

The analysis device receives the first historical session information sent by the message transmission device. The analysis device analyzes the first historical session information, and obtains an analysis result of the first historical session information.

In this embodiment of the present invention, that the distributed system includes the first service server and the second service server is merely an example of the present invention. In this embodiment of the present invention, any quantity of service servers may be included. This is not limited in the present invention.

In this embodiment of the present invention, current session information and historical session information are separately sent to different devices. The historical session information that needs more analyses is sent to a dedicated analysis device, and the current session information that needs a specific analysis capability and a specific control capability is sent to the control device. Therefore, session information is separately processed according to a requirement, and system efficiency is improved.

Figure 3:
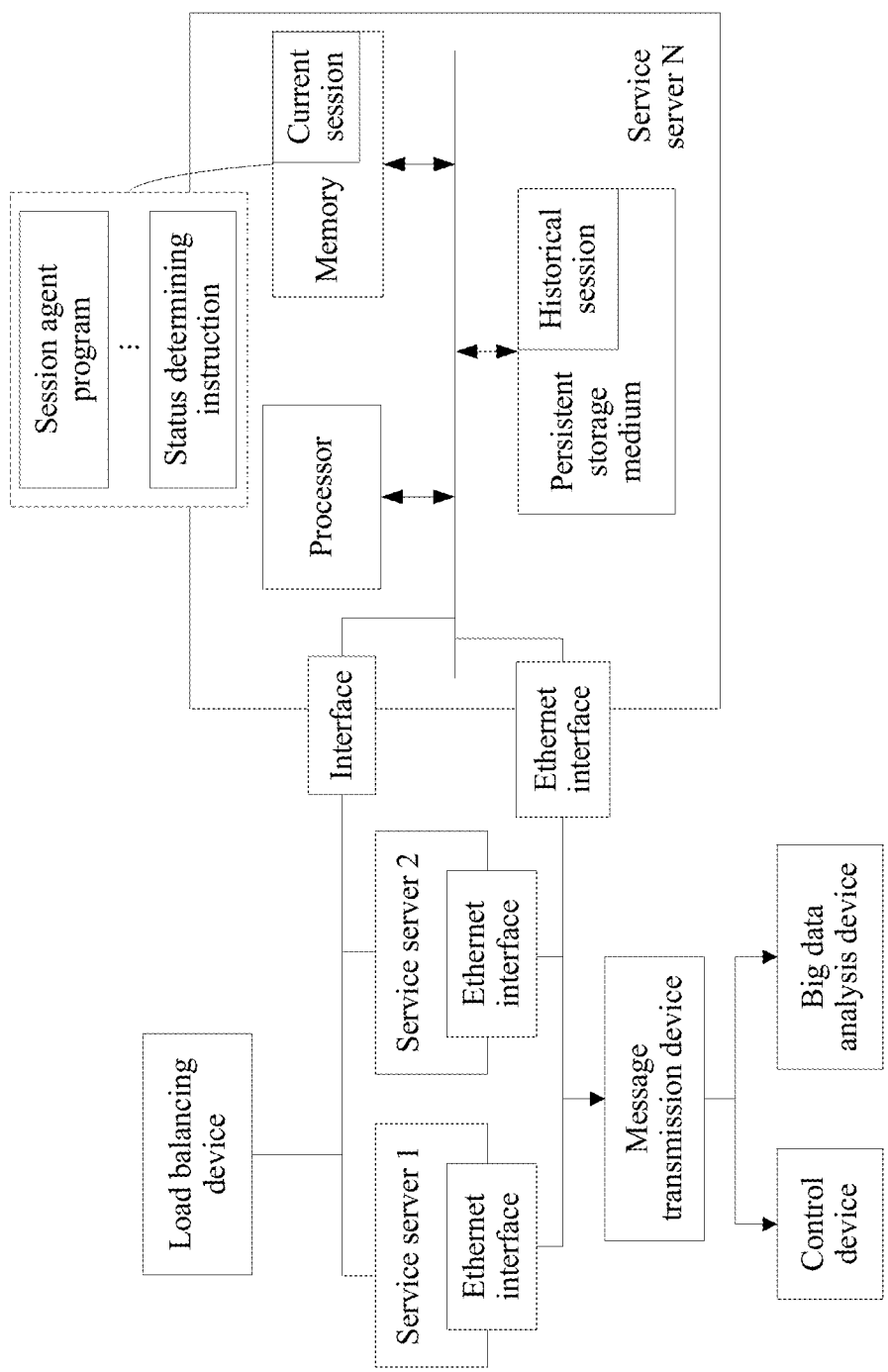
FIG. 3 shows a service server according to an embodiment of the present invention.

An embodiment of the present invention further provides a service server. FIG. 3 shows the service server according to this embodiment of the present invention. As shown in FIG. 3, the service server is applied to a distributed system. The distributed system includes a load balancing device and multiple service servers. The load balancing device receives a request from a client, and allocates the request from the client to one of the multiple service servers. One of the multiple service servers is connected to the client, and generates session information. The session information includes current session information and historical session information. The service serversession information is connected to a message transmission device by using an Ethernet interface. The message transmission device sends the current session information to a control device, and sends the historical session information to an analysis device.

Any one of the service servers includes a processor, a memory, and a persistent storage medium. The processor is configured to process all requests in the service server.

The persistent storage medium is configured to: store data sent by a client, and store historical session information generated when the service server connects to a client. The persistent storage medium further stores an installed application program, for example, a session agent program.

The memory is configured to: cache current session information, modify the current session information by using the processor according to a change in a connection status, and cache an instruction and a program that need to be invoked by the processor, for example, a session agent program and a status determining instruction.

When the service server starts to run, the service server receives a request dispatched by the load balancing device. The request is used to enable the client to establish a connection to the service server and perform another operation. After the connection is established between the client and the service server, current session information is generated, and the current session information is stored in the memory. Each state included in the current session information varies according to a connection status between the service server and the client. When the connection status between the service server and the client is "Disconnected", that is, the service server is disconnected from the client, the current session becomes a historical session, and the current session information becomes historical session information. The historical session information is stored in the persistent storage medium.

When a session between the service server and the client needs to be monitored, the processor invokes the session agent program, so as to obtain session information included in the service server. For the obtained session information, the processor invokes the status determining instruction to determine that each piece of session information in the session information is current session information or historical session information. The current session information and the historical session information are sent to the message transmission device by using an interface, for example, an Ethernet interface.

The service server further receives a control instruction sent by the message transmission device. The control instruction is used for controlling the current session information in the service server. The processor receives the control instruction sent by the message transmission device, invokes the session agent program, executes the session agent program to determine the received control instruction, and executes the control instruction.

In one embodiment, the service server receives a control instruction sent by the message transmission device. The control instruction is used to instruct not to monitor information about a session whose "connection is established before Dec. 31, 2015" in current sessions. Therefore, the session agent program queries the current session information, and determines all current sessions that are in the current session information and whose connections are established before Dec. 31, 2015. IDs of the determined sessions are obtained. When the current session information is being obtained from the service server and sent to the message transmission device, information about sessions with the foregoing IDs are not obtained.

Figure 4:
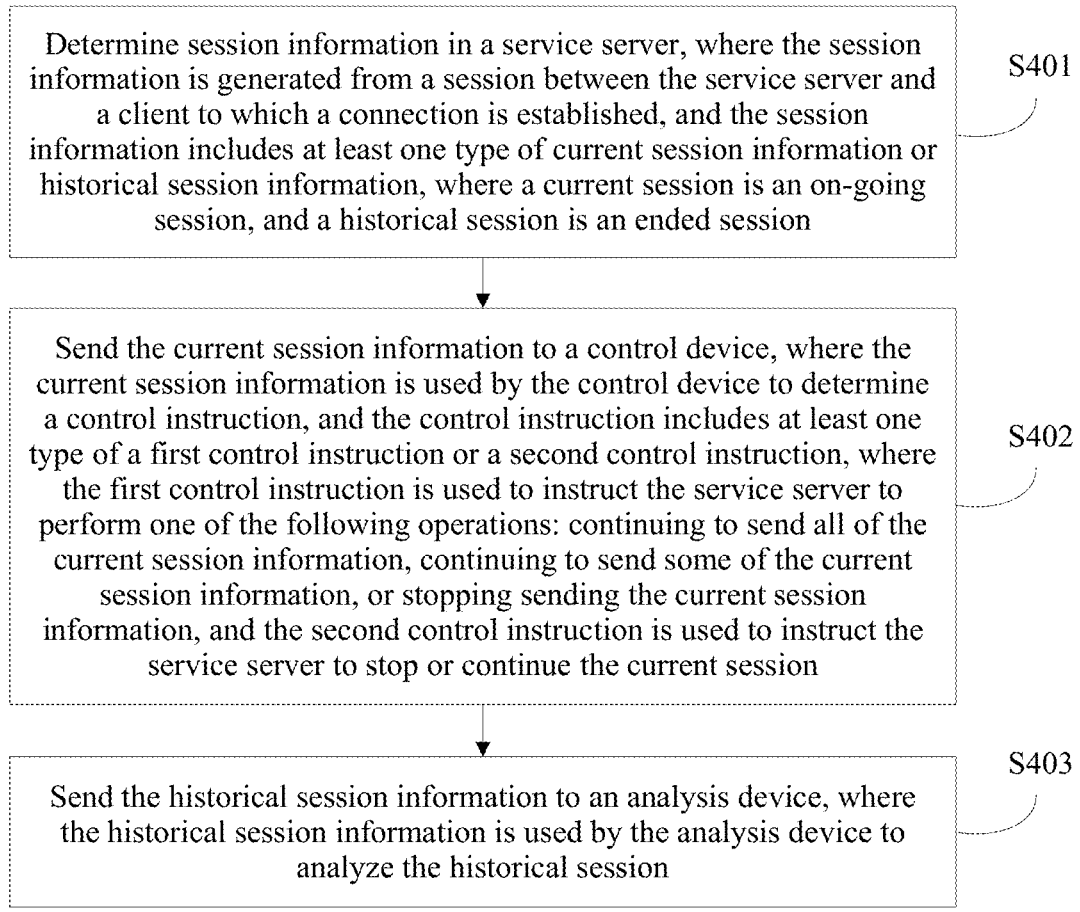
FIG. 4 shows a session monitoring method according to an embodiment of the present invention.

FIG. 4 shows a session monitoring method according to an embodiment of the present invention. The method is used for monitoring a session in a distributed system. The distributed system includes a load balancing device and one or more service servers. The load balancing device is configured to dispatch a request from a client to the one or more service servers. The request is used by the one or more service servers for establishing a connection to the client corresponding to the request, so as to generate session information. As shown in FIG. 4, the method includes the following operations.

Operation S401. Determine session information in the service server, where the session information is generated from a session between the service server and the client to which a connection is established, and the session information includes at least one type of current session information or historical session information, where a current session is an on-going session, and a historical session is an ended session.

The service server includes a specified trigger mechanism. The trigger mechanism is used to determine session information that is included in the service server and that needs to be sent.

In this embodiment of the present invention, each piece of session information includes multiple states, such as Connected, Login, Active, Logout, and Disconnected, and includes information, such as a time, of each state. The service server further includes a status determining unit. After the session information is determined, the status determining unit determines that a status in the session information is a current session or a historical session. In an example, if a status in session information includes the "Disconnected" state, the session information is historical session information. If a status in session information does not include the "Disconnected" state, the session information is current session information.

After determining the session information, the service server sends the current session information and the historical session information to a session agent in the service server. The session agent includes a session sub-module, and the session sub-module sends the current session information and the historical session information to a message transmission device. The current session information is sent by using a current session path. The historical session information is sent by using a historical session path.

In one embodiment, the session information is sent by using an interface (for example, an Ethernet interface) of the service server.

Operation S402. Send the current session information to a control device, where the current session information is used by the control device to determine a control instruction, and the control instruction includes at least one type of a first control instruction or a second control instruction, where the first control instruction is used to instruct the service server to perform one of the following operations: stopping sending the current session information, continuing to send all of the current session information, or continuing to send some of the current session information, and the second control instruction is used to instruct the service server to stop or continue the current session.

Before the historical session information is sent to an analysis device and the current session information is sent to the control device, the current session information and the historical session information need to be sent to the message transmission device.

The message transmission device receives the historical session information, and obtains a service server number included in the historical session information. Historical session information sent by each service server is added to a historical session queue corresponding to the service server. Historical session information included in the historical session queue is sent to the analysis device according to a priority of each piece of information in the queue.

The message transmission device receives the current session information, and obtains a service server number included in the current session information. Current session information sent by each service server is added to a current session queue corresponding to the service server. Current session information included in the current session queue is sent to a session analysis unit of the control device.

The control device receives the current session information sent by the message transmission device, and analyzes the current session information, so as to obtain an analysis result of the current session information. In an example, the current session information may be analyzed by using multiple processes, so as to improve analysis efficiency of the current session information.

The control device further includes a command unit. The command unit is configured to send a control instruction to the service server, so as to change current session information sent to the control device. The message transmission device receives the control instruction sent by the control device. The control instruction includes information about a service server implementing the instruction. When receiving the control instruction, the message transmission device adds the control instruction to a control instruction queue corresponding to the service server according to the information about the service server implementing the instruction, and sends control instructions in the control instruction queue to an interaction sub-module of a session agent in the service server according to a time sequence. The session agent obtains the control instruction, and sends the control instruction to the service server. The service server executes the instruction.

Operation S403. Send the historical session information to an analysis device, where the historical session information is used by the analysis device to analyze the historical session.

In one embodiment, the analysis device may directly connect to the service server. An FTP protocol interface is configured on the service server, and the analysis device directly connects to the service server by using an FTP protocol. The analysis device logs in the service server to obtain the historical session information in the service server. The FTP protocol interface configured on the service server is merely an example of the present invention, and the analysis device may connect to the service server by means of SFTP, TFTP, or the like.

In this embodiment of the present invention, the current session information and historical session information are sent to a control device and an analysis device respectively. The analysis device having a better analysis capability analyzes a historical session, and the control device having both an analysis capability and a control capability analyzes and controls a current session. Therefore, sessions are separately processed according to a requirement, and session analysis efficiency of a system is improved.

Figure 5:
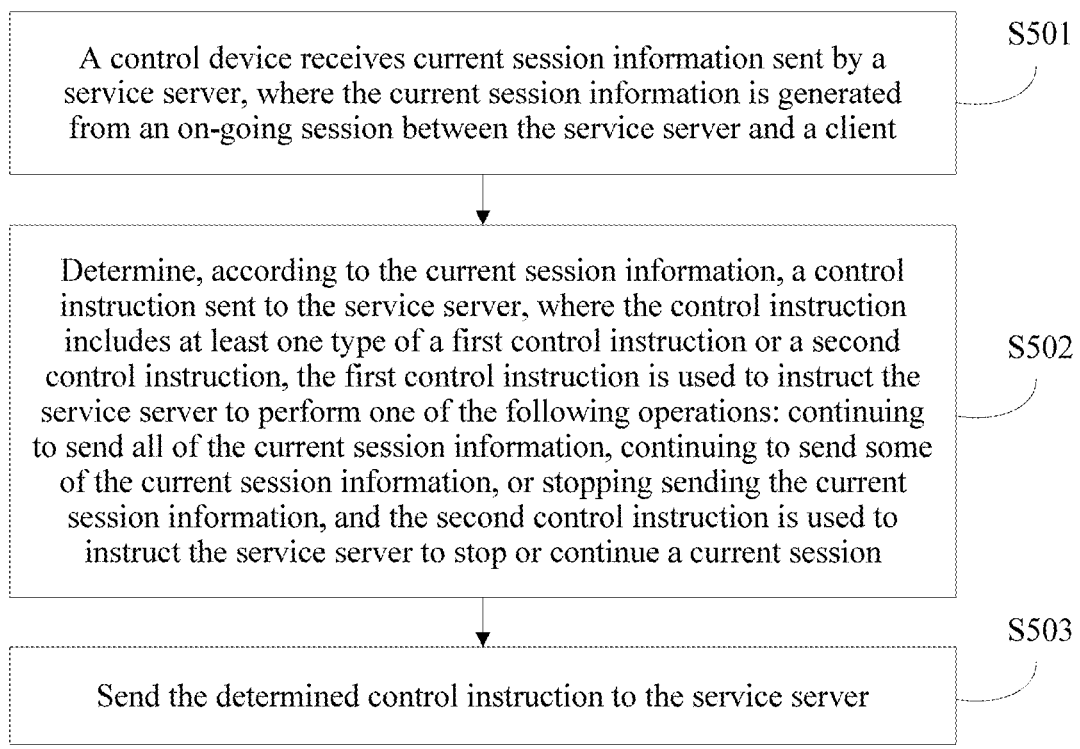
FIG. 5 shows a session monitoring method according to an embodiment of the present invention.

FIG. 5 shows a session monitoring method according to an embodiment of the present invention. As shown in FIG. 5, the method includes the following operations.

Operation S501. A control device receives current session information sent by a service server, where the current session information is generated from an on-going session between the service server and a client.

The control device receives the current session information sent by a message transmission device.

Operation S502. Determine, according to the current session information, a control instruction sent to the service server, where the control instruction includes at least one type of a first control instruction or a second control instruction, a first control instruction is used to instruct the service server to perform one of the following operations: continuing to send all of the current session information, continuing to send some of the current session information, or stopping sending the current session information, and the second control instruction is used to instruct the service server to stop or continue the current session.

The control device includes a session analysis unit. The session analysis unit is configured to analyze the received current session information, so as to obtain content of the current session. In an example, the control device may analyze the current session by using multiple processes, so as to more quickly obtain the content of the current session. This improves working efficiency of the control device, and a control instruction can be more efficiently sent.

The session analysis unit analyzes the current session information, and obtains an analysis result of the current session information, and may further determine the control instruction according to the analysis result of the current session information. Therefore, the current session information sent to the control device is reduced, and the session between the service server and the client may be disconnected.

In one embodiment, the control instruction is used to determine the content of the current session sent by the service server. For example, a session whose "connection is established before Dec. 31, 2015" in current sessions is not monitored. Therefore, current session information received by the control device does not include information about the current session whose "connection is established before Dec. 31, 2015".

Alternatively, the control instruction may be disconnecting the client from the service server generating the session information, so that the current session information becomes historical session information.

Operation S503. Send the determined control instruction to the service server.

After determining that the control instruction needs to be sent to the service server, the control device sends the control instruction to the service server by using the message transmission device. The message transmission device receives the control instruction sent by the control device. The control instruction is added to a corresponding control instruction queue in the message transmission device according to the service server indicated by the control instruction. Control instructions in the control instruction queue are sent to the service server corresponding to the control instruction queue.

In this embodiment of the present invention, current session information is received, the current session information is analyzed, and content of a current session is obtained. The current session is controlled according to the obtained content of the current session. This improves a capability of using the current session, reduces current sessions that need to be analyzed, and improves device efficiency.

Figure 6:
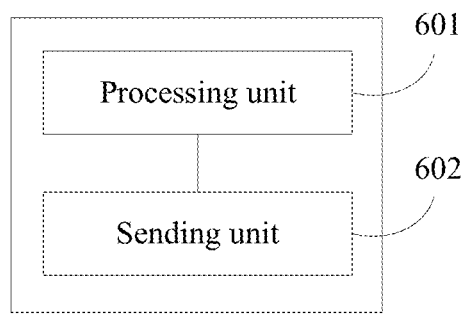
FIG. 6 shows a service server according to an embodiment of the present invention.

FIG. 6 is a schematic diagram of a service server according to an embodiment of the present invention. As shown in FIG. 6, the service server may be configured to monitor a session in the service server. The service server receives a request from a client, establishes a connection to the client according to the request to perform a session, and generates session information. The service server sends the session information to an analysis device and a control device, and the analysis device and the control device analyze the session information. The service server includes a processing unit 601 and a sending unit 602.

The processing unit 601 is configured to determine that the session information in the service server is current session information or historical session information. The session information is generated from the session between the service server and the client to which the connection is established. A current session is an on-going session, and a historical session is an ended session.

An asynchronous trigger mechanism is set in the service server. When session information included in the service server changes, the service server determines the changed session information. In an example, alternatively, session information included in the service server may be determined in a polling manner in the present invention.

In this embodiment of the present invention, each piece of session information includes multiple states, such as Connected, Login, Active, Logout, and Disconnected, and includes information, such as a time, of each state. The service server further includes a status determining unit. After the session information is determined, the status determining unit determines that a status in the session information is a current session or a historical session. If a status in session information includes the "Disconnected" state, the session information is historical session information. If a status in session information does not include the "Disconnected" state, the session information is current session information.

When new session information is generated in the service server or when a new status change occurs in the session information in the service server and the service server determines that a new status change occurs in the session information, the service server obtains the session information, and a status determining unit determines that a status in the session information is a current session or a historical session. If a last state in session information is "Disconnected", the session information is historical session information. If a last state in session information is not "Disconnected", the session information is current session information.

The sending unit 602 is configured to: send the current session information to the control device, and send the historical session information to the analysis device. The current session information is used by the control device to determine to stop sending the current session information, continue to send all of the current session information or send some of current session information, or stop the current session. The historical session information is used by the analysis device to analyze the historical session.

In this embodiment of the present invention, a session agent module is further disposed in the service server. The session agent module includes a session sub-module. The session sub-module receives the current session information in the service server, and the current session information is sent to a second device by using an interface (for example, an Ethernet interface) of the service server. The session sub-module receives the historical session information in the service server, and the historical session information is sent to a first device by using an interface (for example, an Ethernet interface) of the service server. In an example, the first device in this embodiment of the present invention may be a controller or any other device that can analyze data and send a control instruction.

In this embodiment of the present invention, the service server further includes an obtaining unit, and the obtaining unit is configured to: receive a first control instruction sent by the control device, and determine, according to the first control instruction, the current session information sent by the sending unit to the control device. The obtaining unit is further configured to: receive a second control instruction sent by the control device, and determine, according to the second control instruction, that the service server continues or stops the on-going current session with the client.

Figure 7:
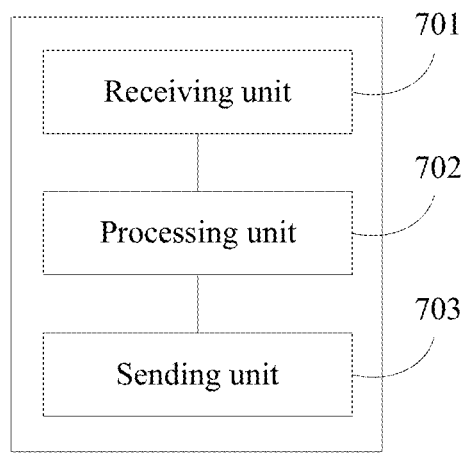
FIG. 7 shows a control apparatus according to an embodiment of the present invention.

FIG. 7 shows a session control apparatus according to an embodiment of the present invention. As shown in FIG. 7, the apparatus specifically includes a receiving unit 701, a processing unit 702, and a sending unit 703.

The receiving unit 701 is configured to receive current session information sent by a service server, and the current session information is generated from an on-going session between the service server and a client.

The control device receives the current session information sent by a message transmission device.

The processing unit 702 is configured to determine a to-be-sent current control instruction according to the current session information. The control instruction includes either a first control instruction or a second control instruction or both. The first control instruction is used to instruct the service server to: stop sending the current session information, continue to send all of the current session information or send some of the current session information, and the second control instruction is used to instruct the service server to stop the current session with the client.

The control apparatus includes a session analysis unit. The session analysis unit is configured to analyze the received current session information, so as to obtain an analysis result of the current session information. In one embodiment, the control apparatus may analyze the current session information by using multiple processes, so as to more quickly obtain content of the current session. This improves working efficiency of the control apparatus, and a control instruction can be more efficiently sent.

After the session analysis unit analyzes the current session information and obtains the analysis result of the current session information, the session analysis unit is further configured to determine the control instruction according to the analysis result of the current session. This reduces current sessions and disconnects the session between the service server and the client.

The sending unit 703 is configured to send the determined control instruction to the service server.

Figure 8:
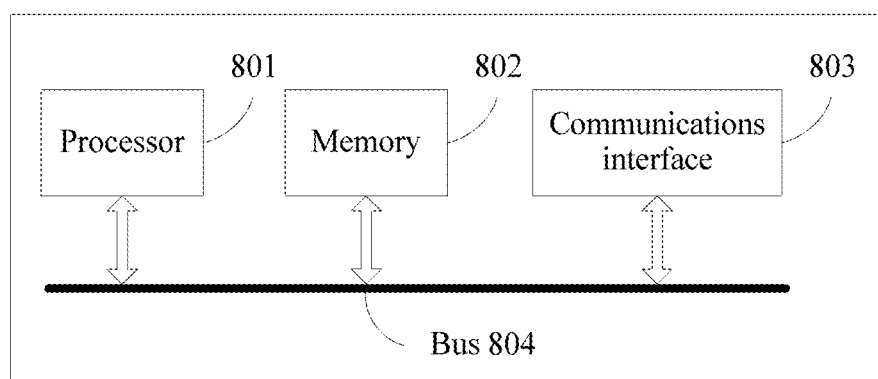
FIG. 8 shows a service server according to an embodiment of the present invention.

FIG. 8 shows a service server according to an embodiment of the present invention. As shown in FIG. 8, the service server includes: a processor 801, a memory 802, a communications interface 803, and a bus 804. The processor 801, the memory 802, and the communications interface 803 implement mutual communications connection by using the bus 804.

The processor 801 may use a general-purpose central processing unit (CPU), a microprocessor, an application specific integrated circuit (ASIC), or one or more integrated circuits, and is configured to execute a related program, so as to implement technical solutions provided in the foregoing method embodiments of the present invention.

The memory 802 may be a read-only memory (ROM), a static storage device, a dynamic storage device, or a random access memory (RAM). The memory 902 may store an operating system and another application program. When the technical solution provided in this embodiment of the present invention is implemented by using software or firmware, program code used to implement any optional technical solution provided in the foregoing method embodiments of the present invention is stored in the memory 802, and is executed by the processor 801. The communications interface 803 is configured to communicate with a switch or a control device.

The bus 804 may include a channel through which information is transmitted between parts (such as the processor 801, the memory 802, and the communications interface 803) of the device.

Figure 9:
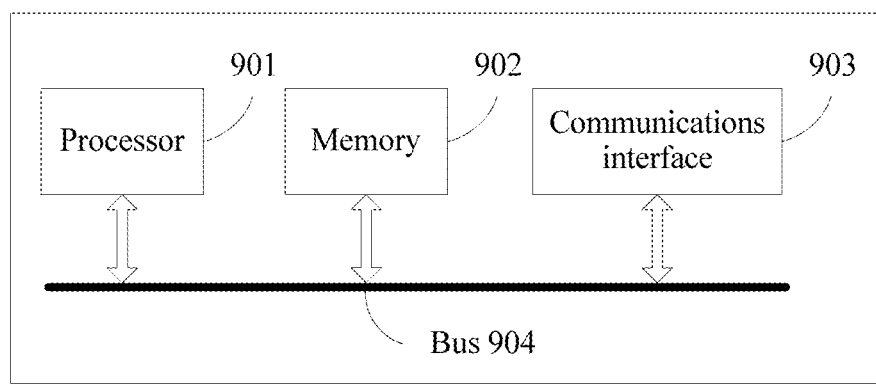
FIG. 9 shows a control device according to an embodiment of the present invention.

FIG. 9 shows a service server according to an embodiment of the present invention. As shown in FIG. 9, the service server includes: a processor 901, a memory 902, a communications interface 903, and a bus 904. The processor 901, the memory 902, and the communications interface 903 implement mutual communications connection by using the bus 904.

The processor 901 may use a general-purpose central processing unit (CPU), a microprocessor, an application specific integrated circuit (ASIC), or one or more integrated circuits, and is configured to execute a related program, so as to implement technical solutions provided in the foregoing method embodiments of the present invention.

The memory 902 may be a read-only memory (ROM), a static storage device, a dynamic storage device, or a random access memory (RAM). The memory 902 may store an operating system and another application program. When the technical solution provided in this embodiment of the present invention is implemented by using software or firmware, program code used to implement any optional technical solution provided in the foregoing method embodiments of the present invention is stored in the memory 902, and is executed by the processor 901. The communications interface 903 is configured to communicate with a switch or a control device.

The bus 904 may include a channel through which information is transmitted between parts (such as the processor 901, the memory 902, and the communications interface 903) of the device.

A person in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Operations of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A session monitoring method, comprising:
   determining session information at a service server configured to establish a connection to a client, wherein the session information is generated from a session between the service server and the client to which the connection is established, and the session information comprises current session information and historical session information, wherein a current session is an on-going session, and a historical session is an ended session;

sending the current session information to a control device, wherein the current session information is used by the control device to determine a control instruction, and the control instruction comprises at least one type of a first control instruction or a second control instruction, wherein the first control instruction is used to instruct the service server to perform one of the following operations: continuing to send all of the current session information to the control device, continuing to send some of the current session information to the control device, or stopping sending the current session information to the control device, and wherein the second control instruction is used to instruct the service server to stop or continue the current session; and sending the historical session information to an analysis device, wherein the historical session information is used by the analysis device to analyze one or more historical sessions.

2. The method according to claim 1, further comprising: receiving the first control instruction from the control device, and determining, according to the first control instruction, the current session information to be sent to the control device.

3. The method according to claim 1, further comprising: receiving the second control instruction from the control device, and continuing or stopping an on-going session with the client according to the second control instruction.

4. A service server, comprising:
a processor;
a memory to store a program and session information;
a communications interface communicatively coupled to an external device and a client; and
a bus, wherein the processor, the memory, and the communications interface are communicatively coupled to each other via the bus,
wherein when the service server runs, the processor is configured to execute the program stored in the memory to:
determine session information in the service server, wherein the session information is generated from a session between the service server and the client to which a connection is established, and the session information comprises current session information and historical session information, wherein a current session is an on-going session, and a historical session is an ended session;
send the current session information to a control device, wherein the current session information is used by the control device to determine a control instruction, and the control instruction comprises at least one type of a first control instruction or a second control instruction, wherein the first control instruction is used to instruct the service server to perform one of the following operations: stopping sending the current session information to the control device, continuing to send all of the current session information to the control device, or continuing to send some of the current session information to the control device, and wherein the second control instruction is used to instruct the service server to stop or continue the current session; and
send the historical session information to an analysis device, wherein the historical session information is used by the analysis device to analyze one or more historical sessions.

5. The service server according to claim 4, wherein the processor is further to receive the first control instruction from the control device, and to determine, according to the first control instruction, the current session information to be sent to the control device.

6. The service server according to claim 4, wherein the processor is further to receive the second control instruction sent by the control device, and to continue or stop an on-going session with the client according to the second control instruction.

7. A non-transitory computer-readable medium storing computer instructions which, when executed by one or more processors, cause the one or more processors to perform a method for session monitoring, the method comprising:
determining session information in a service server, wherein the session information is generated from a session between the service server and a client to which a connection between the service server and the client is established, and the session information comprises current session information and historical session information, wherein a current session is an on-going session, and a historical session is an ended session;
sending the current session information to a control device, wherein the current session information is used by the control device to determine a control instruction, and the control instruction comprises at least one type of a first control instruction or a second control instruction, wherein the first control instruction is used to instruct the service server to perform one of the following operations: continuing to send all of the current session information to the control device, continuing to send some of the current session information to the control device, or stopping sending the current session information to the control device, and wherein the second control instruction is used to instruct the service server to stop or continue the current session; and
sending the historical session information to an analysis device, wherein the historical session information is used by the analysis device to analyze one or more historical session.

8. The non-transitory computer-readable medium according to claim 7, wherein the method further comprises: receiving the first control instruction from the control device, and determining, according to the first control instruction, the current session information to be sent to the control device.

9. The non-transitory computer-readable medium according to claim 7, wherein the method further comprises: receiving the second control instruction from the control device, and continuing or stopping an on-going session with the client according to the second control instruction.

* * * * *